Dec. 9, 1958  A. F. BROZ  2,863,630
VALVE CONSTRUCTION
Filed May 6, 1957
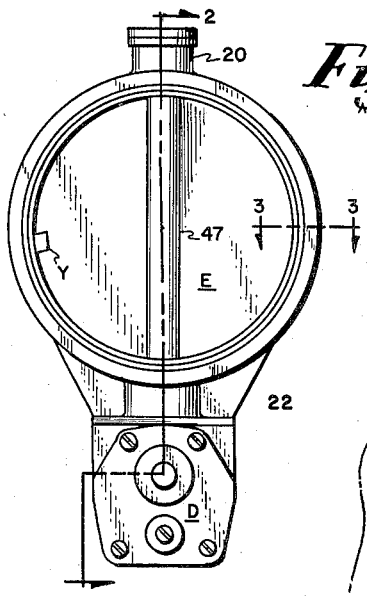
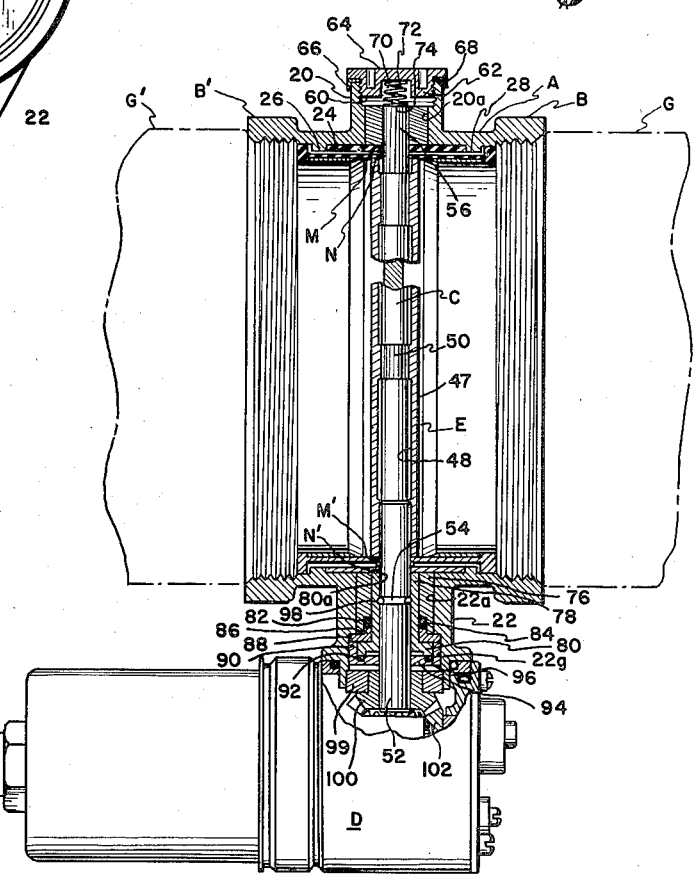
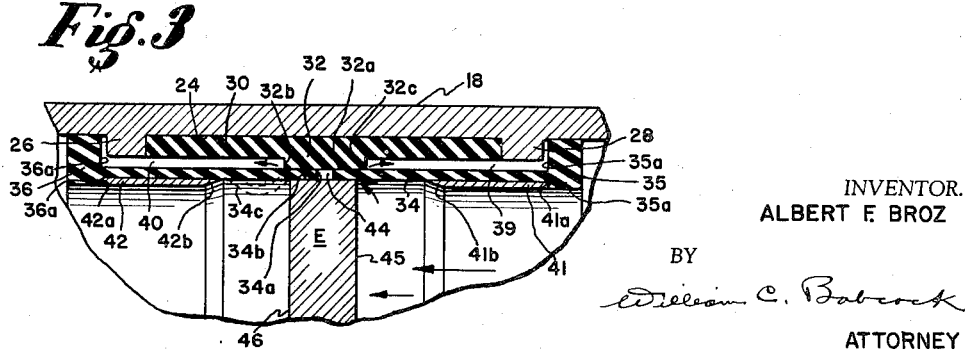
INVENTOR.
ALBERT F. BROZ
BY
William C. Babcock
ATTORNEY United States Patent Office 2,863,630
Patented Dec. 9, 1958

2,863,630

VALVE CONSTRUCTION

Albert F. Broz, Long Beach, Calif., assignor to Idaho Maryland Mines Corporation, San Francisco, Calif., a corporation of Nevada Application May 6, 1957, Serial No. 657,264

8 Claims. (Cl. 251—173)

The present invention relates generally to the field of valves, and more particularly to a butterfly type valve that is adapted for use in controlling the flow of high or low pressure fluids when passing therethrough in either of two possible directions.

Although butterfly valves have been employed in the past in the control of fluids, one of the operational disadvantages of such valves heretofore available has been that they do not afford an effective shut-off for both low and high pressure fluids, and normally it has been necessary to design each valve of this type for the specific fluid pressure that will be encountered, especially with respect to the direction in which the fluid passes through the valve.

A major object of the present invention is to provide a motor-actuated butterfly type valve that is capable of controlling both high and low pressure fluids, irrespective of the direction in which they flow therethrough.

Another object of the invention is to furnish a butterfly valve which is so constructed that the greater the fluid pressure, the greater is the force exerted to seal the circumferential edge portion of the valve plate to the seat it removably engages when in a closed position.

A further object of the invention is to supply a valve of the character described which is of extremely simple mechanical structure, can be manufactured from standard commercially available materials, requires a minimum of maintenance attention, and does not require the use of special machine tools in the fabrication thereof.

These and other objects and advantages of the invention will become apparent from the following description thereof, and from the accompanying drawing, in which:

Figure 1 is an end elevational view of the valve and the actuator used in the operation thereof;

Figure 2 is a combined top plan and horizontal cross-sectional view of the device taken on line 2—2 of Figure 1; and Figure 3 is an enlarged fragmentary transverse cross-sectional view of a portion of the valve plate and housing, taken on line 3—3 of Figure 1.

Referring to the drawing for the general arrangement of the invention, it will be seen to include a tubular housing A, the end portions B and B' of which are internally threaded. A transversely positioned shaft C is pivotally supported in housing A, which when rotated by an actuator D, serves to pivot a circular valve plate E from an open position in which the plate is substantially parallel to the longitudinal axis of housing A to a closed position, as shown in Figures 1, 2 and 3.

In detail, housing A is preferably fabricated as an integral unit from a lightweight metal such as aluminum or an alloy thereof. Housing A includes a tubular shell 18 that terminates in circular end portions B and B', the exterior diameters of which are slightly greater than that of shell 18. Portions B and B' are adapted to threadedly engage threaded end portions of tubes, pipes or conduits G and G' respectively, that are shown in phantom line in Figure 2. Two oppositely disposed bosses 20 and 22 through which bores 20a and 22a, respectively, extend are formed on shell 18. The interior of shell 18 defines a bore 24 of circular cross section. Two ribs 26 and 28 of identical construction and rectangular cross section extend around the surface of bore 24 and are equally spaced on opposite sides of bosses 20 and 22 respectively.

A tubular section 30 is inserted within the confines of housing A positioned between ribs 26 and 28. Section 30 is formed of a resilient material, and a single slit is formed therein (not shown) to permit temporary deformation of this section for insertion thereof within the housing into the position shown in Figure 2. After section 30 is so positioned it immediately expands to snugly contact the surface of bore 24. The wall thickness of section 30 (Figure 3) is substantially the same as that of ribs 26 and 28. A backing ring 32 normally disposed to the longitudinal axis X of housing A is provided at substantially the center of section 30, and projects inwardly therefrom.

A tubular liner 34 is provided formed from a polymerized resinous material of some resiliency, such as that manufactured by E. I. du Pont de Nemours & Co. of Wilmington, Delaware, and marketed under the trademark "Teflon." Identical circular flanges 35 and 36 are formed on the end portions of liner 34 that are preferably rectangular in cross section and so support the liner in housing A that the central exterior surface of the liner contacts the innermost surface 32a of backing ring 32. Ring 32 has two flat opposing circular side walls 32b and 32c, which with the interior face of section 30, the surface of liner 34, and circular side wall surfaces 35a and 36a of flanges 35 and 36, respectively, cooperatively define two closed, substantially annulus-shaped spaces 39 and 40.

Two identical resilient reinforcing bands 41 and 42 are positioned within housing A that bear against the interior end surface portions of liner 34 adjacent flanges 35 and 36. These flanges are preferably formed with inwardly projecting lips 35a and 36a which abut against edges 41a and 42a of bands 41 and 42 respectively, to prevent inadvertent movement of the bands away from one another. The edge portions 41b and 42b of the bands that are closest to one another are preferably tapered and slope outwardly toward the interior surface of liner 34. Bands 41 and 42, together with the interior face 32a of backing ring 32, cooperatively tend at all times to maintain tubular liner 34 in a true cylindrical shape. A number of circumferentially spaced apertures 34a are formed in liner 34 which are centrally located relative to backing ring 32, the purpose of which will be explained hereinafter.

Valve plate E is circular, having a flat circumferential edge 44 which is wider than the diameter of apertures 34a, and having two opposing parallel side walls 45 and 46. Plate E also includes a diametrically extending portion 47 of enlarged cross section through which a longitudinally serrated bore 48 extends. Shaft C has a longitudinally serrated portion 50 that slidably engages the serrated bore 48, as best seen in Figure 2. Shaft C also has a longitudinally serrated end portion 52 which is separated from the serrated portion 50 by a circumferential groove 54. Two opposing circular openings M and M' are formed in tubular section 30 through which shaft C projects. Liner 34 also has two oppositely disposed circular openings N and N' formed therein which are in alignment with openings M and M'. Shaft C (Figure 2) projects through both sets of openings M, N and M', N'.

An end portion 56 of shaft C is rotatably supported in a cylindrical bearing 50 mounted in bore 20a of boss 20. Threads 60 are formed in the outer portion of bore 20a and are engaged by a threaded plug 62 having a flat head 64. A sealing gasket 66 is mounted on the external end face 68 of boss 20, and is compressed when the interior face of head 64 is brought into pressure contact therewith. A cavity 70 is formed in plug 62 in which a compressed helical spring 72 is mounted that contacts the end face 74 of shaft C and at all times urges the shaft toward actuator D.

A bearing 76 is mounted in bore 22a of boss 20 that rotatably supports a cylindrical sleeve 78 having a circular flange 80 formed in the outer end thereof. A longitudinally serrated bore 80a extends through sleeve 80 and slidably engages serrated shaft portions 50 and 52. Bearing 76 has an annulus-shaped recess 82 formed on the outer face thereof in which a resilient O-ring 84 is positioned. A spacer 86 is provided that includes a ring-shaped flange 88, the outer circumferential portion of which abuts against a circular body shoulder 90 defined in boss 22 at the junction of bore 22a and a first counter bore 22b of larger internal diameter. A portion of spacer 86 leads into recess 82 that serves to compress O-ring 84 and prevent escape of fluid from between the contacting surfaces of bearing 76 and sleeve 80. A circular recess 92 formed in the outer surface of a seal plug 94 receives a resilient sealing ring 96. Plug 94 is mounted on shaft portion 52 and serves to maintain ring 96 in sealing contact with flange 80.

The circumferentially extending recess 54 is formed between shaft portions 50 and 52 in which an O-ring 98 is situated that seals against the interior surface of sleeve 78. A thrust bearing 99 is mounted on the outer end portion of boss 22 which rotatably supports a first beveled gear 100 that is rigidly affixed to shaft C. Gear 100 is driven by a second beveled gear 102 forming a part of actuator D, which for purposes of illustration herein is an electrically operated actuator manufactured by the Rotomite Corporation of 1425 Santa Fe Avenue, Long Beach, California. Actuator D forms no part of the present invention and hence need not be described in structural detail. Likewise, the manner in which actuator D is mounted on or affixed to the invention will not be discussed herein, for the means of so doing depends upon the construction of the make or brand of particular actuator employed.

The length and wall thickness of the wall liner 34, as well as the resilient characteristics of the material defining same, are all critical factors in obtaining satisfactory operation of the valve in controlling both low and high pressure fluids. An efficient shut-off at low pressure is obtained when valve plate E is rotated to cause the face 44 thereof to engage the central interior surface 34b of the liner which serves as a valve seat whereby this central portion is sufficiently compressed between face 44 and face 32a of backer ring 32 that flow of low pressure fluid is prevented. When the pressure on the fluid being shut off rises to a point where fluid tends to seep between face 44 and seat 34b, in so doing it enters apertures 34a to pass between the exterior surface of liner 34 and the face 32a of backer ring 32 into the annulus-shaped spaces 39 and 40.

The major portion of the exterior surface of the liner 34 is then exposed to high pressure fluid which has passed valve plate E, and this fluid tends to deform the liner inwardly toward the valve plate on the downstream side thereof. However, the reinforcing rings 41 and 42 serve to prevent any appreciable deformation of the opposing end portions of the liner and limit the liner portions that can be deformed to those sections thereof adjacent sides 32b and 32c of backing ring 32. Although in a situation as described above the fluid can enter both spaces 39 and 40, it will be apparent that deformation of the liner will occur only on the downstream side of valve plate E, for on the upstream side thereof the fluid within the confines of the tubular liner is in substantial equilibrium with that in the annulus-shaped space also located on the upstream side of the plate. Therefore, it will be seen that the present invention can be utilized to seal either low or high pressure fluid which passes longitudinally therethrough in either direction, with the seal for the high pressure fluid always being effected by the high pressure fluid which has passed into the annulus-shaped space situated on the downstream side of plate E.

Operation of the invention is extremely simple. The valve is connected between two pipes, tubes, or conduits G and G', as shown in Figure 2. Although in illustrating the valve, threaded means are shown for effecting connections between conduits G and G' and the valve, it will be obvious that flanges or other conventional connections can be utilized equally well for this purpose. The direction of fluid flow through the valve has no bearing on the efficiency of valve plate E in effecting a shut-off thereof.

After the valve has been joined to conduits G and G', the actuator D is connected to a source of electrical energy (not shown) employed in operating the valve. When it is desired to shut off the flow of either low or high pressure fluid passing through the valve in one of the two possible directions, actuator D is energized to cause rotation of shaft C and valve plate E to the extent that the valve plate is moved from a position substantially parallel to the longitudinal axis A to the position shown in Figures 1, 2 and 3 wherein plate E is normally disposed relative to liner 34. The internal diameter of backing ring 32, wall thickness of liner 34, and diameter of plate E are so related that the circumferentially extending portion of liner 34 between backing ring 32 and valve plate E when the plate is in the closed position is under sufficient compression to effect a fluid seal against the flow of low pressure fluids. Should it be desired, a top Y may be provided that extends inwardly from the interior of housing A (Figure 1), and is so positioned as to prevent further rotation of plate E after it has reached the closed position. In the event the pressure on the fluid passing through the valve is sufficiently high to cause the fluid to seep between the circumferential edge of plate E and surface 34b of liner 34, the fluid passing therethrough enters apertures 44 to flow between backing ring surface 34a and the adjacent external surface of liner 34 into annulus-shaped spaces 39 and 40.

By way of illustration of the valve operation in effectively obstructing the flow of high pressure fluids therethrough, assume that the direction of fluid flow is from pipe G to pipe or conduit G'. The fluid which seeps or flows into space 39 has no influence in effecting a fluid-tight seal between the valve plate E and liner 34, for the fluid in space 39 is at substantially the same pressure as that located on the upstream side of the valve plate. However, the fluid in space 40 is under high pressure and tends to move the entire cylindrical portion of liner 34 inwardly between flange face 36a and backing ring face 32b.

Backing ring 42 (Figure 3) prevents such inward deformation of the portion of liner 34 in contact therewith. However, the unsupported liner portion between edge 42b of the reinforcing ring and the valve plate edge 46 deforms inwardly to the position 34c as shown in phantom line in Figure 3, which position is grossly exaggerated over what actually occurs in normal operation. Portion 34c of liner 34 is longer than when in the undistorted position, whereby the deformed portion is under increased tension, which in turn is transmitted to that portion 34b of the liner between backing ring 32 and the circumferential edge 44 of the valve plate. Due to the inward position of the deformed portion 34c immediately adjacent valve plate face 46, the direction of increased tension thereon is parallel thereto, and has an inwardly directed component that increases the force with which liner portion 34b is urged into fluid sealing contact with edge 44 of plate E. Because the deformed portion 34c and liner portion 34b are integral parts of the whole liner, this increased tensional force is transmitted to portion 34b.

Increasing the longitudinal tension on liner portion 34c and to a degree on portion 34, decreases the wall thickness thereof, but this is an advantage in that high pressure fluid flow meets with decreased resistance from the upstream side of plate E into space 40. The same sealing effect above described is obtained by use of the invention when the direction of high pressure fluid flows from pipe G' to G. The only difference in this reversal of fluid flow is that the deformed portion 34c is located between reinforcing ring edge 41b and side 45 of valve plate E.

It will therefore be understood that only the annulus-shaped space 39 or 40 on the downstream side of valve plate E is necessary to effect a fluid-tight seal on high pressure fluids. Accordingly, if it is desired to supply a valve which is only to be used for the control of high pressure fluid that always flows in one direction therethrough, the annulus-shaped space on the upstream side of plate E may be dispensed with, which is most easily achieved by extending backing ring 32 to fill in this space. As an example, in Figure 3 it will be seen that if the flow of fluid is always from right to left, the backing ring 32 would be extended to face 35a to completely fill annulus-shaped space 39.

Although the form of the invention herein shown and described is fully capable of achieving the objects and providing the advantages hereinbefore mentioned, it is to be understood that it is merely illustrative of the presently preferred embodiment thereof and that I do not mean to limit myself to the details of construction herein shown and described other than as defined in the appended claims.

I claim:

1. A valve for use in controlling the flow therethrough of either high or low pressure fluid, comprising: a tubular housing; a resilient cylindrical liner having a plurality of circumferentially spaced apertures formed therein positioned within said housing, which liner is of such external diameter that an annulus-shaped space is defined between said liner and housing; means that hold said liner and housing in said spaced relationship and close the ends of said annulus-shaped space; a transversely disposed shaft rotatably supported in said housing and extending through said liner; a circumferentially extending backing ring situated within the confines of said housing that is sufficiently wide to completely cover said apertures; a circular valve plate of greater thickness than the individual diameter of said apertures, which plate is rigidly affixed to said shaft and is of such diameter that when it is normally disposed relative to said liner the circumferentially extending face thereof, together with said backing ring, cooperatively compress a circumferentially extending portion of said liner to obstruct the flow of said low pressure fluid through said liner and when the pressure on said fluid rises sufficiently to cause seepage thereof between said plate and liner to enter said apertures and flow into said space on the downstream side of said plate said fluid in said space urges at least a portion of said liner inwardly on the downstream side of said plate with sufficient force thereagainst to completely obstruct fluid flow from the upstream to the downstream side of said plate; and means for rotating said shaft and plate to place said plate in or remove it from the position wherein it is disposed substantially normal relative to said longitudinal axis of said housing.

2. A valve of the character defined in claim 1 wherein said liner holding means comprises two ring-shaped flanges that engage the interior surface of said housing.

3. A valve as defined in claim 2 wherein a tubular section is provided that supports said ring and is sufficiently thick to partially fill said annulus-shaped space.

4. A valve as defined in claim 3 wherein two longitudinally spaced ribs are provided which project inwardly from the interior surface of said housing and snugly engage the ends of said section to prevent longitudinal movement thereof.

5. A valve of the character defined in claim 4 wherein said backing ring is centrally disposed on said section, with said ring, section, liner and flanges co-operatively defining two closed annulus-shaped spaces on the upstream and downstream sides of said valve plate when said plate is normally disposed relative to the longitudinal axis of said housing.

6. A valve as defined in claim 5 wherein two reinforcing rings are provided that engage the interior surfaces of said liner adjacent said flanges, which rings prevent appreciable inward deformation of said liner portions in contact therewith.

7. A valve as defined in claim 6 wherein at least one end portion of said shaft projects outwardly from said housing and said means for rotating said shaft is a prime mover rigidly affixed to said housing and operatively connected to said projecting portion of said shaft.

8. A butterfly valve of the type including a tubular housing, a transversely disposed shaft rotatably supported in said housing, a circular valve plate rigidly affixed to said shaft, and means for rotating said shaft and plate to place said plate in or remove it from a closed position wherein it is disposed substantially normal to the longitudinal axis of said housing, which is characterized by a resilient cylindrical liner disposed within said housing and extending in both directions from said plate when the latter is in its closed position, means defining a substantially annulus-shaped confined space between said liner and said housing on the downstream side of said plate, means provided on the interior surface of said housing for rigidly supporting the portion of said liner which is contacted by said plate when in its closed position, and passageway means provided in said portion of said liner and responsive to pressurized fluid on the upstream side of said plate for admitting said fluid into said confined space thereby to deform said liner inwardly and thus to preclude leakage of said fluid past the edges of said plate to the downstream side thereof.

References Cited in the file of this patent

UNITED STATES PATENTS

| | | |
|---|---|---|
| 1,834,870 | Rogers | Dec. 1, 1931 |
| 2,529,572 | Raybould | Nov. 14, 1950 |
| 2,673,708 | Danks | Mar. 30, 1954 |
| 2,809,060 | Thompson | Oct. 8, 1957 |